Nov. 21, 1944. D. H. HANSON 2,363,319
LOCK WASHER
Filed Nov. 13, 1943
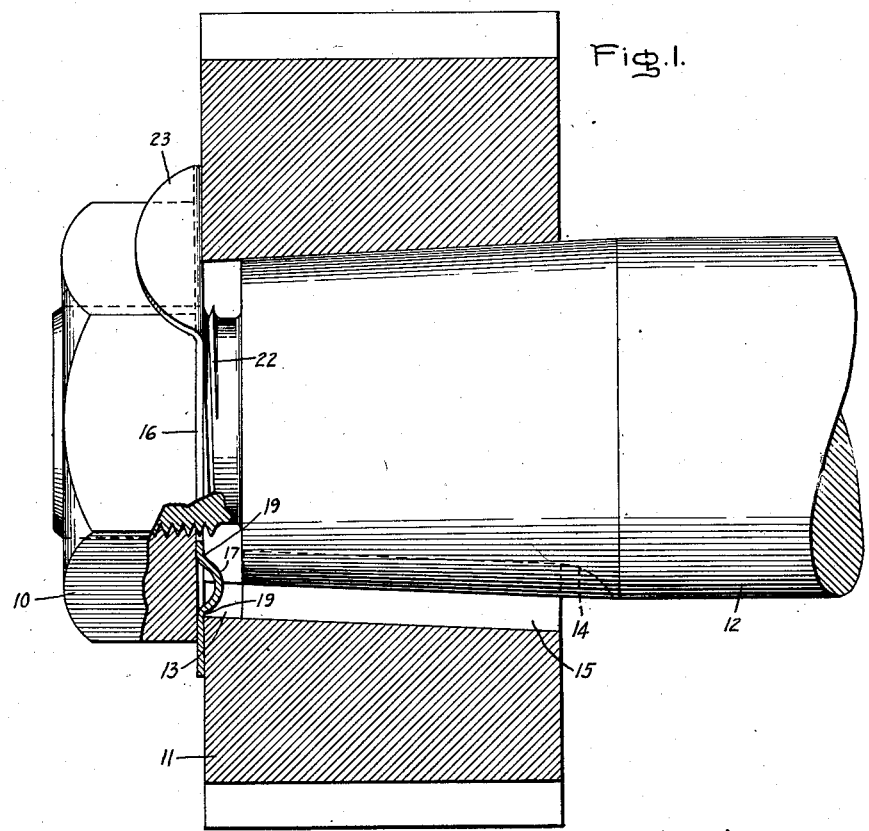
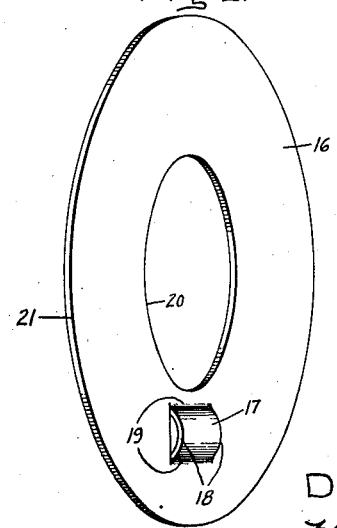
Inventor:
David H. Hanson,
by Harry E. Dunham
His Attorney.

Patented Nov. 21, 1944

2,363,319

UNITED STATES PATENT OFFICE 2,363,319

LOCK WASHER

David H. Hanson, Erie, Pa., assignor to General Electric Company, a corporation of New York Application November 13, 1943, Serial No. 510,153

2 Claims. (Cl. 151—53)

My invention relates to lock washers.

An object of my invention is to provide a lock washer which is adapted to secure a nut against relative rotation with respect to another element.

Another object of my invention is to provide a lock washer having a portion adapted to extend into an opening in another element which is covered by a nut adapted to be locked in position by the lock washer.

Further objects and advantages of my invention will become apparent and my invention will be better understood from the following description referring to the accompanying drawing, and the features of novelty which characterize my invention will be pointed out with particularity in the claims annexed to and forming part of this specification.

In the drawing, Fig. 1 is a side elevational view, partly in section, illustrating an embodiment of my improved lock washer applied to a nut for retaining a keyed pinion in position on a shaft; and Fig. 2 is a perspective view of the lock washer shown in Fig. 1.

Referring to the drawing, I have shown an embodiment of my improved lock washer construction adapted to retain a flat-sided hex nut 10 against rotation relative to a pinion 11 which is mounted on a shaft 12. The pinion 11 and shaft 12 are formed with keyways 13 and 14, respectively, and a key 15 is arranged in these two key-ways to prevent relative rotation between the pinion 11 and the shaft 12. My improved lock washer is formed with an annular portion 16 of a larger diameter than the nut 10 and is provided with a locking element which comprises a punched out projecting section 17 in the annular portion 16 which is formed with two opposite sides 18 cut from the annular portion 16. The two opposite ends 19 of the punched-out portion 17 between the sides 18 remain attached to the annular portion 16 between the inner and outer edges 20 and 21 of the washer, and thereby provide a double anchor for the projecting locking element 17 which doubles the force required to shear the indented element 17 over what would be required if the indented element were to be cut loose at one end from the material of the annular washer. This indented locking element 17 is adapted to extend into a keyway, groove, or opening in an element, such as a pinion, coupling, or brake wheel, to be secured in position, and the sides 18 of the projecting section have substantially flat side edges arranged substantially at right angles to the direction of turning of the nut as shown in Fig. 2 and are adapted to fit snugly against the sides of the opening by making the projecting element 17 substantially the same width as the keyway, groove, or opening, thus providing a locking element which is complementary to the opening in the secured element. As shown in Fig. 1, this projecting element 17 is placed in the end of the keyway 13, and the nut 10 is then drawn up tightly on the threaded portion 22 of the shaft 12. An outer portion 23 of the lockwasher 16 then is bent up into locking engagement with one of the flat sides of the nut 10 and prevents relative rotation between the nut and the lockwasher. Thus, the nut 10 is anchored by the up-turned portion 23 to the lock washer 16 which is anchored to the pinion 11 by the projecting section 17, and the pinion 11 is retained against rotation relative to the shaft 12 by the key 15, thus providing a completely interlocked assembly.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States, is:

1. A lock washer having an annular portion adapted to be interposed between a flat-sided nut and the surface of another element, said annular portion having a diameter larger than the nut and being adapted to have a portion arranged in engagement with one of the flat sides of the nut for preventing relative rotation between the nut and said lock washer, and a locking element comprising a punched-out projecting section in said annular portion secured at two opposite ends to the continuous part of the annular portion of the lock washer and having substantially flat side edges arranged substantially at right angles to the direction of turning of said nut for engagement with the sides of a complementary opening in the other element for preventing relative rotation between the lock washer and the other element.

2. A lock washer having an annular portion adapted to be interposed between a flat-sided nut and the surface of another element, said annular portion having a diameter larger than the nut and being adapted to have a portion arranged in engagement with one of the flat sides of the nut for preventing relative rotation between the nut and said lock washer, and a locking element comprising a punched-out projecting section in said annular portion formed with two opposite sides cut from said annular portion intermediate the inner and outer edges thereof and having substantially flat side edges arranged substantially at right angles to the direction of turning of said nut for engagement with the sides of a complementary groove in the other element for preventing relative rotation between the lock washer and the other element.

DAVID H. HANSON.